Oct. 20, 1931.    I. LUNDGAARD    1,828,286
STUFFING BOX
Filed Aug. 5, 1926
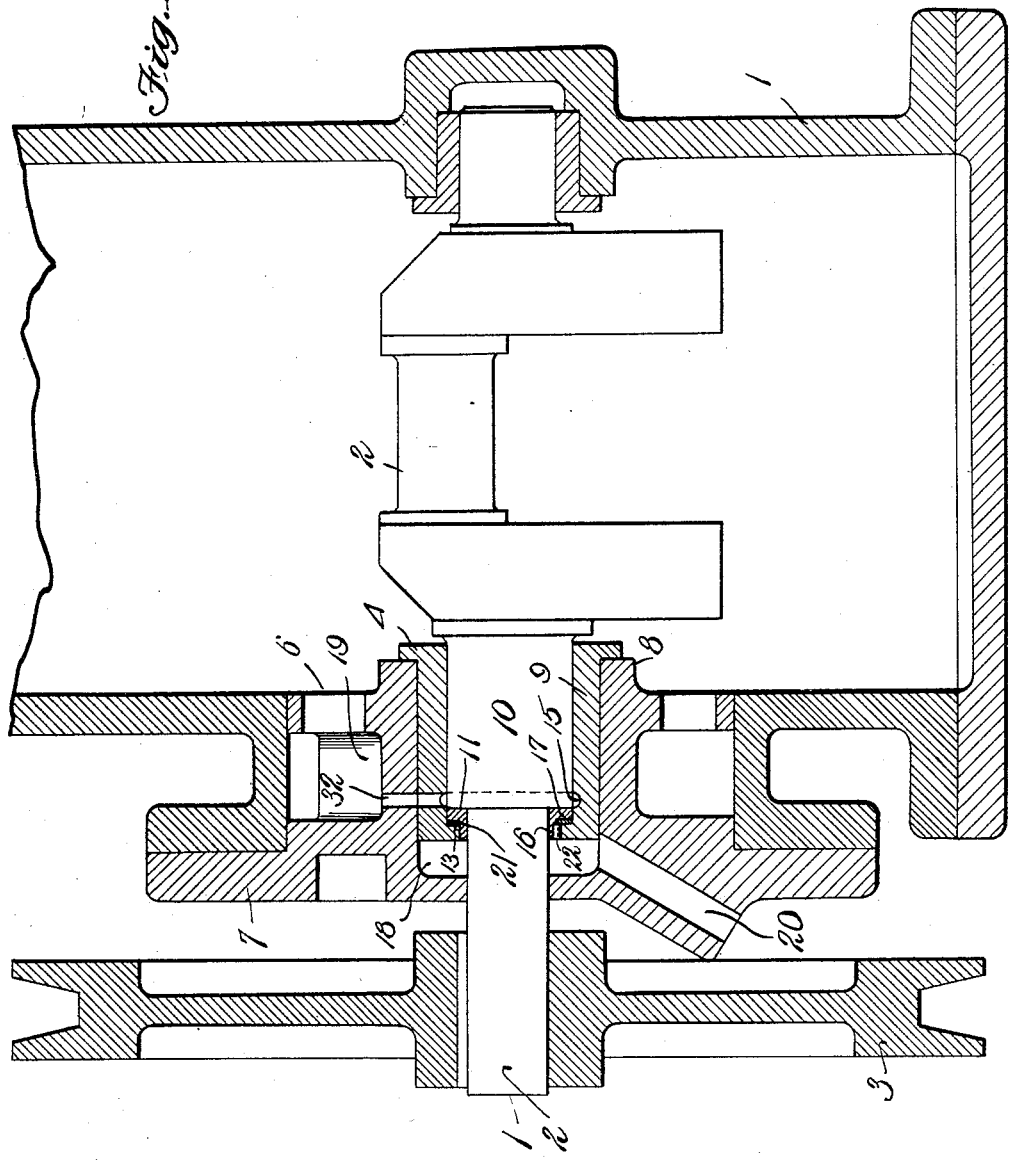
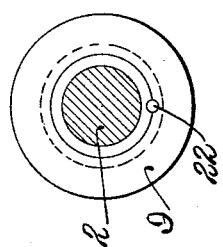
Inventor
Ivar Lundgaard
by Roberts, Cushman & Woodberry,
Att'ys Patented Oct. 20, 1931

1,828,286

UNITED STATES PATENT OFFICE

IVAR LUNDGAARD, OF WORCESTER, MASSACHUSETTS, ASSIGNOR TO DEVON MANUFACTURING COMPANY, OF BOSTON, MASSACHUSETTS, A CORPORATION OF MASSACHUSETTS

STUFFING BOX

Application filed August 5, 1926. Serial No. 127,293.

This invention relates to a stuffing box construction which is adapted to use in a wide variety of installations wherein it is desirable to have a revolving shaft project through the wall of a casing upon opposite sides of which different fluid pressures prevail.

A stuffing box of the type disclosed herein is more particularly intended for use in refrigerating apparatus using air as a mediating fluid, such as disclosed in my Patent No. 1,240,862, or in a machine of the same general type in which the average internal pressure is considerably higher than the atmospheric pressure. It will, however, be evident that a stuffing box construction of this type, which is adapted to provide an efficient oil seal at a minimum expense, will be equally useful in numerous locations, as, for example, in pumps, motors, internal combustion engines, particularly of the two-cycle crank case compression type, and many other machines.

The present invention provides a very inexpensive stuffing box construction which is adapted to maintain a substantially air-tight oil seal about a revolving shaft and indeed to retain air at considerable pressure within a casing and in some respects it may be considered to be an improvement upon a simplification of the construction disclosed in my pending application Serial No. 127,294, filed on even date herewith.

In a machine of this class provided with reciprocating parts, such as pistons, connecting rods and the like, and having a main shaft in which there are crank throws, etc., there is always a degree of vibration or whip in the crank shaft which may be merely perceptible, but which, however, is sufficient seriously to interfere with the maintenance of a bearing fit accurate enough to prevent the escape of air. While the amount of such vibration may not be so great as the normal oil clearance in the main journal bearing provided with splash lubrication, such a condition is prone to permit considerable oil leakage and leakage of air suspended therein. It is therefore necessary to provide special means for retaining a bearing member in close engagement with a portion of the revolving shaft and yet to compensate for the slight vibrations occurring during the rotation of the shaft as well as slight irregularities in alignment, workmanship, etc. It is furthermore desirable to provide such a bearing member with its close bearing fit upon an annular shoulder of the shaft rather than upon the cylindrical bearing portion thereof, since the degree of vibration may be somewhat lower and since the bearing stresses resulting from the weight of the shaft and centrifugal and inertia forces are not directly borne. In a device of this type it is often possible to have an annular bearing member merely act as a thrust bearing to balance the internal pressure acting upon a portion of the shaft, and such a construction is disclosed in the present embodiment of the invention; it having been found in practice that a layer of fibrous material, preferably paper which is somewhat compressible and of the character used for gaskets or the like is adapted to comprise suitable backing for an annular bearing member with a flange in engagement with a shoulder on the revolving shaft, to retain the bearing member in comparatively tight fit thereagainst, yet to compensate for minor vibrations and variations in alignment, fitting, etc. and when associated with a suitable oil seal to provide a practically air-tight construction.

One specific embodiment of the invention is disclosed in the accompanying drawings, in which:

Fig. 1 is a vertical cross-section of the crank case of a machine embodying my improved stuffing box construction; and Fig. 2 is a detail sectional view of the same.

For the purpose of illustration, I have shown my improved stuffing box as it is installed in the crank case of a refrigerating machine adapted to use air as a mediating fluid. For example, in a machine of this type the air in the crank case 1 may normally be under an average pressure which will be equal to two or three atmospheres. The machine is actuated by a suitable crank shaft 2 which is driven by a pulley 3 keyed upon an overhanging projection of the shaft. The opposite end of crank shaft 2 is mounted in a suitable bearing 4 within the case 1.

The improved stuffing box construction which more particularly forms the subject matter of the present invention is located in the wall of the crank case, or the motor end adjoining the overhanging projection of the shaft. This motor end may preferably be provided with a double wall indicated by the numerals 6 and 7, and forming an annular oil chamber 19 therebetween which communicates with the interior of the crank case 1. At the centre of chamber 19 is located a boss 8 which holds a bearing 9 adapted to engage the cylindrical portion 10 of the crank shaft 2. The end of the cylindrical portion 10 of the shaft is defined by a shoulder 11 and the remaining overhanging portion of the shaft is of a reduced diameter. Preferably the bearing 9 has an inturned flange or shoulder 13 adapted to project inwardly toward the axis of the shaft 2, but spaced somewhat from the shoulder of the shaft.

In order to provide a substantially airtight bearing for the shaft 2, a bushing 16 is located in the inturned flange portion 13 of the bearing member 9 and has an out-turned annular flange 17 in engagement with the shoulder upon the revolving shaft. Between the inturned flange upon the bearing and the outturned flange upon the bushing 16 is located a washer or gasket 21 of compressible material, preferably fibrous material such as paper of about a thirty-secondth of an inch in thickness, which is adapted to hold the flange 17 in firm, but slightly yieldable, engagement with the shoulder upon the revolving shaft, or in other words the compressibility of the paper permits a minute movement of the bushing 16 with its flange 17 to compensate for flexures in the shaft 2 and minor inaccuracies in workmanship, fitting, or the like, in the bearing and shaft. The annular oil groove 15 adjoining the flange 17 is adapted to provide an oil seal at this point and may be connected with the chamber 19 by duct 32 to receive sufficient oil. Normally the internal air pressure will tend to press the crank shaft endwise into comparatively firm engagement with the flange 17, and the oil seal provided adjoining the flange in combination with the close engagement of the flange and shoulder will prevent practically all leakage of air from the casing 1. It is to be understood that between the shaft 2 and the bearing member 9 as well as the cylindrical portion of the bushing 16, the usual clearance for the oil film may be provided, while the annular flange 17 is adapted to bear upon the shoulder of the shaft with but a minute clearance, which is not sufficient to allow the leakage of an appreciable amount of oil, and consequently the leakage of air suspended therein.

Spaced outwardly from the end of the bearing 9 and the flange 17 may be a suitable chamber 18 formed in the crank case 2 and provided with a downwardly extending duct 20 which is adapted to guide oil which leaks outwardly along the bushing 16 into a suitable sump below the crank case in order to conserve the oil supply.

Ordinarily it will not be found necessary to lock the bushing 16 in the bearing except by an ordinary press fit. However, if desired, positive locking means may be provided as illustrated; for example, the bushing and bearing flange 13 may be drilled to receive a locking pin 22 (Fig. 2).

It is evident that in the manufacture of a stuffing box of this type the only point requiring especially accurate fitting or lapping is the restricted bearing area between the flange 17 and the shoulder upon the crank shaft and, therefore, that the present invention requires the minimum of skilled labor and of accurate fitting or assemblying and that it dispenses with the need of expensive and complicated packings or gaskets in order to provide a practically air-tight stuffing box.

I claim:

1. A stuffing box construction comprising a shaft adapted to revolve, a relatively fixed casing including a bearing portion through which the shaft extends, a shoulder upon the shaft adjoining one end of the bearing portion, a bushing with its body portion engaging the casing provided with an annular flange in close bearing engagement with the shoulder on the shaft, and an annular paper gasket between the flange and the fixed casing adapted to hold the flange in firm but slightly yieldable engagement with the revolving shoulder.

2. A stuffing box construction comprising a casing in which internal pressure is adapted to be higher than external pressure, a shaft adapted to revolve in the casing and having one end projecting therefrom, a bearing at the side of the casing through which the shaft projects, an oil chamber in the casing communicating with said bearing, a portion of the shaft engaging said bearing, a shoulder on the outer end of said portion, a bushing having an annular end portion in bearing engagement with said shoulder and a paper gasket retaining said end portion in firm but slightly yieldable engagement with the shoulder on the shaft which is normally pressed against the flange by internal pressure in the casing.

3. A stuffing box construction comprising a casing in which internal pressure is adapted to be higher than external pressure, a shaft adapted to revolve in the casing and having one end projecting therefrom, a bearing at the side of the casing through which the shaft projects, an oil chamber in the casing communicating with said bearing permitting the drainage of oil from said chamber to said bearing, a portion of the shaft engaging said bearing, a shoulder on the outer end of said portion, a bushing having an annular end portion in bearing engagement with said shoulder and a compressible gasket retaining said end portion in firm but slightly yieldable engagement with the shoulder on the shaft, which is normally pressed against the flange by internal pressure in the casing, an oil groove at the end of the bearing and next to the annular flange, and an outer chamber upon the casing adapted to receive oil leakage about the bushing.

Signed by me at Boston, Massachusetts, this 2nd day of August, 1926.

IVAR LUNDGAARD.